(12) United States Patent
Gallet et al.

(10) Patent No.: US 7,267,868 B2
(45) Date of Patent: Sep. 11, 2007

(54) COMPOSITE PRODUCTS AND MOLDED ARTICLES OBTAINED FROM SAID PRODUCTS

(75) Inventors: Régis Gallet, Pont-d-Cheruy (FR); Marie-France Wilhelm, Panossas (FR)

(73) Assignee: Hexcel Composites S.A., Montluel Cedex (FR)

( * ) Notice: Subject to any disclaimer, the term of this patent is extended or adjusted under 35 U.S.C. 154(b) by 155 days.

(21) Appl. No.: 10/648,159

(22) Filed: Aug. 25, 2003

(65) Prior Publication Data
US 2004/0071948 A1 Apr. 15, 2004

(51) Int. Cl.
*D04H 1/00* (2006.01)
*D04H 3/00* (2006.01)
*D04H 5/00* (2006.01)
*B32B 3/10* (2006.01)
*B32B 37/12* (2006.01)
*B32B 7/12* (2006.01)
*B31B 1/62* (2006.01)
*B29C 65/02* (2006.01)

(52) U.S. Cl. ............. 428/292.1; 156/60; 156/73.6; 156/310; 156/327; 428/131; 428/137

(58) Field of Classification Search ......... 428/98, 428/137, 172, 220, 320.2, 354
See application file for complete search history.

(56) References Cited

U.S. PATENT DOCUMENTS

| 3,472,675 | A | * | 10/1969 | Himmel et al. ............. 428/131 |
| 3,666,615 | A | * | 5/1972 | Toshiharu et al. .......... 428/377 |
| 3,674,021 | A | * | 7/1972 | Snyder et al. ................ 602/8 |
| 3,935,355 | A | * | 1/1976 | Kuhn .......................... 403/267 |
| 4,243,462 | A | * | 1/1981 | Hori et al. ................... 156/310 |
| 4,798,752 | A | * | 1/1989 | McLoughlin et al. ...... 428/34.9 |
| 4,836,879 | A | * | 6/1989 | Edwards ..................... 156/330 |
| 4,888,247 | A | * | 12/1989 | Zweben et al. ............. 428/105 |
| 4,908,273 | A | * | 3/1990 | Urech et al. ................ 428/413 |
| 5,268,055 | A | * | 12/1993 | Bales et al. ................. 156/252 |
| 5,490,602 | A | * | 2/1996 | Wilson et al. ............... 216/56 |
| 5,698,725 | A | * | 12/1997 | Hayashi et al. ............. 556/413 |

FOREIGN PATENT DOCUMENTS

FR 2.036.235 12/1970

\* cited by examiner

*Primary Examiner*—Rena Dye
*Assistant Examiner*—Brett A Crouse
(74) *Attorney, Agent, or Firm*—W. Mark Bielawski; David J. Oldenkamp

(57) ABSTRACT

An uncured composite product having a middle fibrous reinforcement, a thermosetting-resin based layer and a hardening-agent based layer for the thermosetting resin. The thermosetting-resin based layer is placed on one side of the fibrous reinforcement and the hardening-agent based layer is placed on the other side so that the fibrous reinforcement forms a physical barrier between the thermosetting resin and the hardener. When heated, the thermosetting resin and/or hardener flows across the physical barrier to provide mixing and resultant curing.

21 Claims, 2 Drawing Sheets

COMPOSITE PRODUCTS AND MOLDED ARTICLES OBTAINED FROM SAID PRODUCTS

BACKGROUND OF THE INVENTION

1. Field of the Invention

The present invention concerns the technical area of composite products, more particularly, products used for the fabrication of molded articles or parts.

2. Description of Related Art

Composite molded articles are light and at the same time strong. They are used in a wide variety of applications, including: aeronautical construction, for example for the design of airplane wings; aerospace and naval construction, for example for the fabrication of ship masts or hulls; automobile manufacturing; the mechanical electrical industries; and the fabrication of sports articles such as skis, tennis rackets and sail boards.

One of the fabrication techniques for molded articles involves using prepregs formed of an impregnated fibrous reinforcement, generally a resin that associates a thermosetting polymer and a cross-linking agent, also called a hardening agent, and possibly additives that serve to improve the performance of the molded article obtained.

The prepregs are laid up in a mold so as to obtain the desired shape and linked to each other by cross-linking the thermosetting polymer.

However, the prepregs are difficult to store at room temperature. Indeed, the fact that fibrous reinforcement is impregnated with a homogenous mixture of thermosetting polymer and its cross-linking agent at room temperature leads to a cross-linking reaction, slow, to be sure, of the thermosetting resin.

Thus, a major inconvenience associated with the use of such prepregs is that they require cold storage to minimize the change in the resin during storage. In addition, cross-link reaction control processes are often necessary when prepregs are used in designing molded parts. The consequence of the change in the resin is that the prepregs must be used rather quickly or they become unusable. Solutions that provide composite products in which the resin matrix has good storage qualities at room temperature have therefore been sought.

U.S. Pat. No. 3,666,615 describes the combination of a layer of thermosetting resin and a layer of hardener in which the two layers are separated by a film that prevents any contact between the resin and the hardener. The film is made of a material that melts when heated. Thus, raising the temperature eliminates the physical barrier made by the film and establishes contact between the thermosetting resin layer and the hardener layer which can then react. A fibrous base is included in the thermosetting resin layer or in the hardener layer and fills the function of a strengthener. Nevertheless, this technique requires using a film of a different type from the thermosetting resin, which complicates the system.

The application for a European patent published under number EP 1 072 634 uses adjacent layers of reactive materials, but in this case, there is no physical barrier separating the resin and the cross-linking agent. Therefore, the cross-linking reaction may take place at the interface of the layers during storage.

It appears then that the preceding techniques are not entirely satisfactory. In that context, there is a need for composite products comprising first, a reinforcement structure and second, a system combining a thermosetting resin that can undergo a cross-linking reaction. This product should provide satisfactory stability at room temperature, thus facilitating storage.

SUMMARY OF THE INVENTION

The product according to the invention should also be constructed using simple techniques and should be easy to implement in the ultimate design of molded parts, in particular. Another technical problem that the invention is intended to resolve is furnishing an easily handled product. Another purpose of the invention is furnishing moldable products in which chemical additives can be incorporated to optimize the performance of the articles obtained from said products.

The subject of the present invention is also a composite product comprising a middle fibrous reinforcement, a thermosetting-resin based layer and a layer based on a hardening agent for the thermosetting resin. The thermosetting-resin layer is placed on one of the large surfaces (sides) of the fibrous reinforcement and the hardening agent-layer is placed on the other large surface (side) of the fibrous reinforcement so that the fibrous reinforcement forms a physical barrier between the thermosetting resin and the hardener.

Thus the invention uses a dry fibrous reinforcement as a barrier to separate the reagents placed on each of its surfaces. It suffices to heat the product according to the invention to a sufficient temperature to obtain the fusion of the thermosetting resin and the hardener and to lead to their diffusion inside the fibrous reinforcement. Furthermore, during polymerization, the dry reinforcement fulfills the role of static mixer in the mold to ensure the total homogeneity of the thermoset matrix obtained. The fibrous reinforcement also offers passages that enable the volatile matter created during polymerization of the resin to escape.

The subject of the present invention is also a composite article, in particular a molded composite article, obtained from a composite product defined above.

The subject of the present invention is also a fabrication process for such a composite article, including the following stages.

Different composite products according to the invention are stacked.

The stack obtained is kept under low pressure, subjected to vibrations to facilitate diffusion of the thermosetting resin and the hardener inside the fibrous reinforcement, then heated to a temperature sufficient to ensure the cross-linkage of the thermosetting resin.

The subject of the invention is also another variant of a fabrication process, in which the stack obtained is subjected to a thermocompression operation at a temperature sufficient to ensure cross-linkage of the thermosetting resin.

Various other qualities are seen in the description given below in reference to the attached drawings, which show, as examples but not limited to them, embodiments of the subject of the invention.

The above discussed and many other features and attendant advantages of the present invention will become better understood by reference to the detailed description when taken in conjunction with the accompanying drawings.

DETAILED DESCRIPTION OF THE INVENTION

Figure 1:
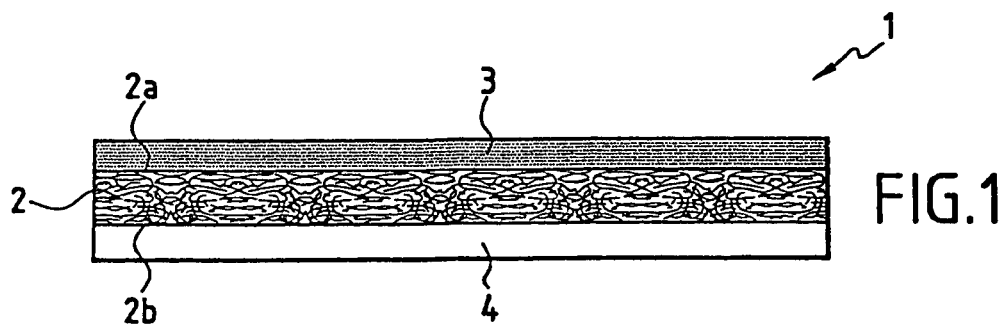
FIG. 1 is a schematic partial section of a composite product according to the invention.

FIG. 1 shows that the composite product, designated as a whole by the reference 1. The composite product 1 comprises a fibrous reinforcement 2, in the general shape of a panel or layer comprising on one of its large or flat surfaces, for example 2a, a thermosetting-resin based layer 3. On the other large or flat surface 2b, a hardening-agent based layer 4 is placed. The hardening agent is adapted to the thermosetting resin. The fibrous reinforcement is described as a middle layer because it is sandwiched between the thermosetting-resin based layer 3 and the hardening-agent based layer 4. At least part of the thickness of the reinforcement 2 is dry, that is, without thermosetting resin and hardening agent and therefore it functions as a physical barrier between the two chemical reagents. Therefore, the composite product according to the invention is stable at room temperature, since the cross-linking reaction cannot be activated by the cross-linking agent physically placed at a distance from the resin during storage. Furthermore, the composite product according to the invention becomes very reactive when it is heated. Heating leads first to the liquefaction of the thermosetting resin and the hardening agent, which penetrates the reinforcement, then to the cross-linking reaction of the resin to obtain a thermoset system.

Typical textile forms include simple textile fabrics, knit fabrics, twill fabrics and satin weaves. In non-woven materials, fibrous or cut-filament mats, for example, can be used. Continuous mats or felts may be used. It is also possible to envisage using non-woven or non-crimped fiber layers. The fibrous reinforcement 2 may be assembled in the form of blanks in a single or multiple layers. The mesh size (openings) in the fibrous reinforcement 2 should be sufficient, first, to permit flow of the thermosetting resin and the hardening agent in the liquid state and, second, to permit elimination of the volatile products created during the cross-linkage reaction. Nevertheless, this mesh size should be low enough a) during storage to avoid the migration of any reagents and b) to obtain impregnation of the fibers and a sufficient mixture within the fibrous reinforcement 2 after heating. Preferably, a mesh size (openness) of less than 10% and even better, less than 5% will be selected.

The fibrous reinforcement 2 may be based on synthetic or natural fibers, for example, fiberglass, carbon or aramid (aromatic polyamide) fibers, but the invention is particularly appropriate for fiberglass and carbon fibers. Hybrid or mixed fiber systems may also be envisaged. The use of cracked (i.e. stretch-broken) or selectively discontinuous fibers may be advantageous to facilitate lay-up of the product according to the invention and improve its capability of being shaped.

The surface mass of fibers within the fibrous reinforcement 2 is generally 80-4000 $g/m^2$, preferably 100-2500 $g/m^2$, and especially preferably 150-2000 $g/m^2$. The number of carbon filaments can vary from 3000 to 320,000, again preferably from 12,000 to 160,000 and most preferably from 24,000 to 80,000. For fiberglass reinforcements, fibers of 600-2400 tex are particularly adapted.

In the thermosetting-resin based layer 3 it is possible to use liquid or solid thermosetting resins or a mixture of both, for example, epoxies, bismaleimide, polyester, vinyl or phenol ester. The preferred resin systems are those that present a high flow at temperatures near 60° C. As an example, with epoxy resins it is possible to obtain appropriate resin viscosities by mixing the appropriate proportions of solid and liquid epoxy resins commercially available, including, if necessary, reactive diluents such as butanediol diglycidyl ether or neopentyl glycol digllycidyl ether. There is a large range of solvents or diluents available, which vary according to the function and structure of the thermosetting resin. As commercially available diluents, the aliphatic alcohol or polyol diglycidyl ethers may be mentioned. Appropriate resin viscosities may also be obtained by using mixtures of resins with a higher molecular weight. In certain cases, a light weight fabric such as glass style 104, that is, a light glass 20-$g/m^2$ fabric defined by the IPC (Institute of Printed Circuits), may be integrated into the thermosetting-resin based layer 3 to ensure integrity. The thermosetting resin typically represents 30%-45% in weight of the total weight of the composite product according to the invention and, again preferably, 35%-40%.

The hardening-agent based layer 4 contains one or more hardening agents, also called catalysts, polymerization or cross-linkage agents which are, for example, in the case of epoxy-type thermosetting resin, selected from among cyanoguanidine, aromatic and aliphatic amines, acid anhydrides, Lewis acids, substituted ureas, imiidazoles and hydrazines. Bismaleimides are generally catalyzed with triphenylphosphine and imidazoles. Accelerating agents such as bisphenol-S may also be added to amine polymerization systems with weak reactivity, and dicyandiamide diurea mixtures. As with the resin layer, it is possible to use a light support fabric. The resin and the hardener should be present in the correct stoichiometric ratios and in sufficient quantity to give a 30-45% content of the thermoset resin in the article obtained after cross-linkage.

One of the advantages of the composite product 1 according to the invention is that it is possible to place additives that modify performance near their planned point of action. It is indeed possible to place preferentially flame retardants on the surface of the composite product 1 that will form the surface of the molded article ultimately fabricated, rather than throughout the structure. Appropriate performance modifiers include tougheners such as nylon, polyethersulfone, polyetherimide, flame retardants (such as zinc borate, ammonium polyphosphate), silica powder, antiputrefaction or antifungal agents like substituted isothiozolinones (protection against mold), organic tin compounds and copper compounds (marine applications). Other performance additives could include flow modifiers (for example, silicas), pigments, dyes, softeners, extenders, wetting agents, diluents, antistatic agents, adhesion enhancers, antioxidants, UV stabilizers, air-release additives, form-release agents and corrosion inhibitors. These additives can then be incorporated in the thermosetting-resin based layer 3 and/or the hardening-agent based layer 4 preferably, when said layer forms one of the surfaces of the composite product 1 (called the "outer layer"). Whichever additives are added, it is important to ensure that the resin or hardening agent viscosity remains low enough during the polymerization and consolidation stages. In effect, the viscosity obtained after heating should enable them to diffuse within the fibrous reinforcement. In particular, it is preferable that the viscosity remain lower than 20,000 mPa·s at heating temperature.

The composite product 1 according to the invention generally appears in the form of a continuous layer or mat, that is, the different layers of the fibrous reinforcement 2, of the thermosetting-resin based layer 3 and of the hardening-agent based layer 4 are preconsolidated. That, for example, is the case when the resin and the hardening agent present a certain residual adhesiveness, also called "tack," which ensure the bond between the different layers. This type of layer is then easily rolled up and can then be presented in the form of a reel. It can, however, be foreseen that the composite product 1 according to the invention will appear in the form of individual cut sheets, corresponding to the constituent layers, prestacked only, without being bonded to each other.

Also, according to a preferred embodiment of the invention, the adhesive properties of the thermosetting-resin based layer 3 and the hardening-agent based layer 4 will be sufficient to keep the fibrous reinforcement 2 in position, whatever be the manner in which it is formed. According to an alternate embodiment, only the middle thickness or center of the fibrous reinforcement 2 remains dry. The fibers placed on the outer thicknesses, that is starting from the flat surface 2a or 2b of the fibrous reinforcement, can be partially compacted within the thermosetting resin based layer 3 or the hardening-agent based layer 4 to improve adhesion. In another alternative, the fibrous reinforcement 2 can be held against the thermosetting-resin based layer 3 or against the hardening-agent based layer 4 by means of an adhesive. It is understood that the adhesive does not prevent displacement of the resin or the hardening agent in the fibrous reinforcement 2 during the later production of a molded article.

In an alternative embodiment, an adhesive agent and/or a binder may be applied to one surface or to the two surfaces of the multilayer composite product 1 according to the invention. The adhesive/binder agent is preferably applied in the form of a light coating. Typically, the adhesive/binder may be applied in the amount of 0.5%-7% of the fiber weight. The presence of such an agent will help keep the composite product 1 within the mold in later applications.

Many combinations of fibrous reinforcements 2, thermosetting-resin based layers 3 and hardening-agent based layers 4 are possible. The only constraints are that the resin layer and the hardener layer must always alternate and they must be oriented when stacked so they do not contact each other. In addition, the resin and hardener layers must be separated by a fibrous reinforcement that is dry over at least a part of its thickness, thus establishing a physical barrier between said interacting components. For example, the outer layers may be formed of two layers of resin film or two layers of reinforcement or one layer of resin film and one layer of reinforcement. For example, the thermosetting-resin based layer 3 and/or the hardening-agent based layer 4 is covered with an outer fibrous reinforcement which preferably is free of thermosetting resin or hardening agent respectively, at least on its outer thickness. That is, one of the outer surfaces, or even both, of the composite product 1 is formed of a layer of dry fibers.

When the composite product of the present invention includes two fibrous layers bonded to opposite surfaces of the resin layer, the fibrous layers may be oriented in the same direction or in different directions. In particular, the orientation of the skin fibers of the sandwich material may be 0° C., 90°, 0°/90°±45% or quasi-isotropic or 0°/+45°/−45°.

The processes for depositing the resin and the hardening agent are well known to a person skilled in the art. They include, but are not limited to, coating by blade or by roller, reverse roller coating, powder spraying and electrostatic depositing. It is possible to vary the extent of impregnation of the reinforcement for each combination of resin systems, provided that the finished composite product includes at least one dry thickness of fibrous reinforcement fulfilling the function of separator.

Figure 2:
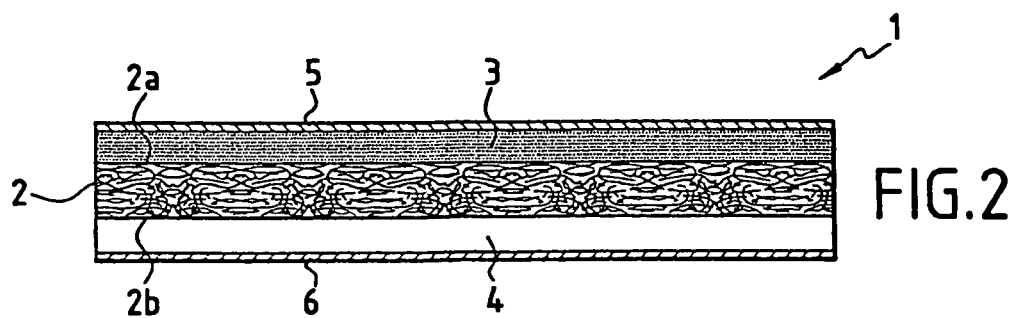
FIGS. 2-5 are schematic partial sections, analogous to FIG. 1, but illustrating other variants of embodiments of the composite product according to the invention.

The thermosetting-resin based layer 3 and the hardening-agent based layer 4 may thus take the form of an adhering film, a prepreg or a paste. In the case where the outer surface of the composite product 1 is formed of a layer of thermosetting resin or of hardener in the form of a paste, covering the paste with a protective film or paper 5 or 6, as shown in FIG. 2, could advantageously be considered so as to ensure coherence. The present of such a film, which will be removed before the composite product 1 is used, also permits easier handling. The layer of thermosetting resin and/or hardener may also be obtained from a powder, the grains of which have been amalgamated after softening. The present invention also has composite articles as a subject, in particular molded articles obtained from composite product 1 according to the invention. To obtain an improved surface appearance for the molded article, it is preferable to lay out the composite product 1 so that a dry thickness of the fibrous reinforcement is placed against the surface of the mold. This is accomplished by positioning a composite product 1 according to the invention, with an outer fibrous reinforcement placed on the thermosetting-resin based layer 3 or on the hardening-agent based layer 4. The dry fibrous reinforcement then forms at least one surface of the composite product that has an outer thickness that is dry. A molded article is thus obtained that presents a high quality surface visibly free of pinholes or surface porosity.

The composite products according to the invention may be used for molding a wide range of molded composite products or articles. Examples include products used in the marine industry such as boat hulls, masts, spars: products used in the aerospace industry such as fuselage parts; products used in the motor vehicle industry such as parts for automobile, van and truck bodies; products used in the sports industry such as surf boards, sail boards, skis, bicycles and hockey sticks; and those products used in other industries such as composite tools, composite tubing and turbine blades, such as those used in wind machines. The present invention also covers fabrication processes for molding composite articles such as those where the composite product is placed in a mold then polymerized. One or more composite products according to the invention can possibly be used in association with conventional molding materials such as prepregs.

Different composite products 1 according to the invention are stacked in a mold preferably alternating the thermosetting resin layer and the hardening layer so that they do not contact each other. The stack obtained is then kept under low pressure, subjected to vibrations to facilitate diffusion of the thermosetting resin and the hardener within the fibrous reinforcement 2, then heated to a temperature sufficient to ensure cross-linkage of the thermosetting resin. According to another alternative, cross-linking may be accomplished by thermocompression. It is advantageous to perform the cross-linkage step under low pressure in order to help eliminate volatile substances that may be released.

The mixing, consolidation and polymerization of the thermohardened matrix may be achieved in different ways: polymerization at 5-15 bar in a matched clamp mold; polymerization in a vacuum bag with vibration by rollers; ultrasounds and the like. The vibrations that may be produced at room temperature or during the initial stages of polymerization help consolidate the flow of resin in the layers and the removal of entrapped air. The polymerization cycle is governed by the formulation of the specific matrix. It is desirable to choose a polymerization program that will maintain the temperature at a point where the resin viscosity is low.

The following examples illustrate the invention, but they are in no way limiting:

LY 1556: liquid epoxy resin without solvent: bisphenol-A diglycidyl ether sold by Vantico AG, viscosity 9500-12,000 mPa·s at 25° C.

LY 5052: liquid epoxy resin without solvent, viscosity: 1000-1500 mPa·s at 25° C., density at 25° C.: 1.17 g/cm$^3$, flash point $\geq$140°, sold by Vantico AG.

HY 5052: liquid hardener without solvent mixture of polyamides, viscosity: 40-60 mPa·s at 25° C., density at 25° C.: 0.94 g/cm$^3$, flash point $\geq$110° C., sold by Vantico AG.

GT 6071: solid epoxy resin, F=70-75° C., viscosity at 25° C. (in a 40% butylcarbitol solution): 160-190 mPa·s; epoxy index: 2.15-2.22 equivalent/kg; epoxy equivalent: 450-465 g/equivalent; density at 25° C.: 1.18; flash point >200° C., sold by Vantico AG.

Curimid NB: 1-benzyl-2-methylimidazole, sold by Borregaard Industries Ltd.

EXAMPLE 1

Figure 3:
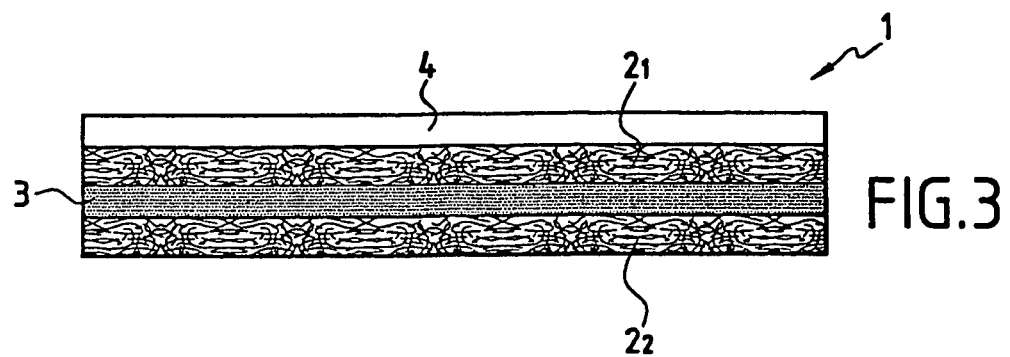

A composite product 1 according to FIG. 3 is produced with the following multilayer structure: layer $2_2$ of an 8-harness satin weave glass fabric marketed under style 7781 by Hexcel Fabrics with a 303-g/m$^2$ surface mass, covered with an LY 1556 thermosetting-resin based layer 3, covered with a second fibrous reinforcement $2_1$ identical to the first $2_2$, covered itself with an HY 5052 hardening-agent based layer 4. The thermosetting resin content before polymerization is about 43% by weight. The formulation is LY 5052 (72.5%), HY 5052 (27.5%).

A laminated item is constructed by stacking five of the composite products according to Example 1. Vibrations are applied at room temperature. The polymerization reaction is conducted over 12 hours at 80° C. at low pressure. The laminated item obtained presents a satisfactory appearance, it is pale green in color and the components have been totally mixed.

EXAMPLE 2

Figure 5:
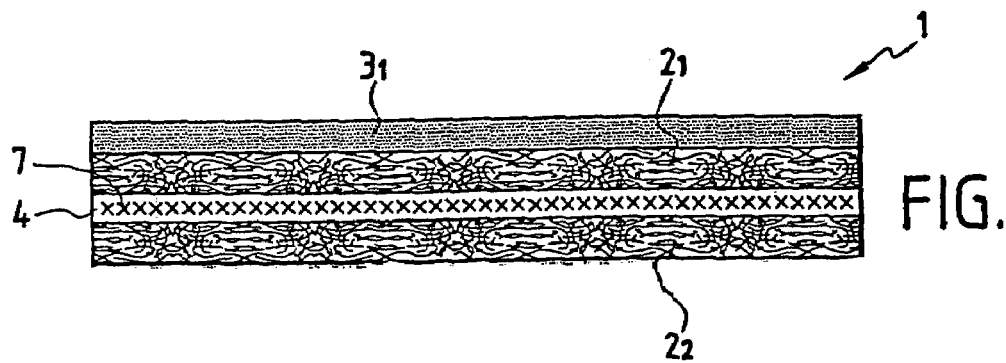

A composite product 1 according to FIG. 5 is constructed with the following multilayer structure: layer $2_2$ of glass fabric (Style 7781) with a 303-g/m$^2$ surface weight, covered with a layer 4 of Curimid NB hardening agent incorporating a 20-g/m$^2$ light glass cloth 7, covered with a second fibrous reinforcement $2_1$, identical to the first $2_2$, covered itself with a layer $3_1$ of thermosetting resin based on LY 1556 and GT 6071. The formulation is LY 1556 (64.4%), GT 6071 (27.6%) and Curimid NB (8.0%). The thermosetting resin content before polymerization is about 44% by weight. The composite product 1 shown in FIG. 5 has high tack and high flow.

A laminated item is constructed by stacking four composite products according to Example 2. Vibrations are applied at 50° C. The polymerization reaction is conducted over 4 hours at 80° C. under low pressure. The laminate obtained presents a satisfactory appearance; it is dark in color.

EXAMPLE 3

Figure 4:
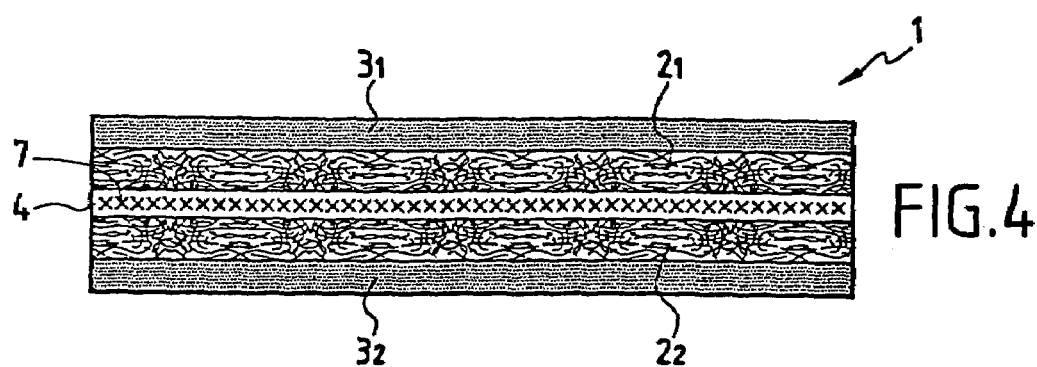

A composite product 1 according to FIG. 4 is constructed with the following multilayer structure: layer $3_2$ of thermosetting resin based on LY 1556 and GT 6071, covered with a layer $2_2$ of glass fabric (Style 7781) with a 303-g/m$^2$ surface weight covered with a layer 4 of Curimid NB hardening agent incorporating a 20-g/m$^2$ light glass fabric 7, covered with a second fibrous reinforcement $2_1$, identical to the first $2_2$, covered itself with a layer $3_1$ of thermosetting resin based on LY 1556 and GT 6071. The formulation is LY 1556 (64.4%), GT 6071 (27.6%) and Curimid NB (8.0%).

The thermosetting resin content before polymerization is about 44% by weight. The composite product 1 shown in FIG. 4 presents high tack and high flow.

A laminated item is constructed by stacking four composite product 1 according to Example 3. Viibrations are applied to 50° C. The polymerization reaction is conducted over 2.5 hours at 80° C. under low pressure. The laminate obtained presents a satisfactory appearance; it is caramel-colored.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited to the above preferred embodiments and examples, but is only limited by the following claims.

What is claimed is:

1. An uncured composite product comprising:
   a fibrous reinforcement layer including a first side, a second side and a fibrous body having openings therein between said first and second sides;
   a resin layer located on said first side of said fibrous reinforcement layer, said resin layer being in contact with said first side of said fibrous reinforcement layer and wherein said resin layer consists essentially of a thermosetting resin; and
   a hardening agent layer located on said second side of said fibrous reinforcement layer, said hardening agent layer being in contact with said second side of said fibrous reinforcement layer and consisting essentially of a hardening agent for said thermosetting resin wherein said fibrous body provides a physical barrier that prevents contact between said thermosetting resin and said hardening agent.

2. An uncured composite product according to claim 1 wherein a fibrous reinforcement layer is located on both sides of said hardening agent layer.

3. An uncured composite product according to claim 1 wherein a fibrous reinforcement layer is located on both sides of said resin layer.

4. An uncured composite product according to claim 1 wherein said resin layer is in the form of an adhering film.

5. An uncured composite product according to claim 1 wherein said resin layer is in the form of a paste.

6. An uncured composite product according to claim 1 wherein said resin layer is covered with a protective film or paper.

7. An uncured composite product according to claim 1 wherein said hardening agent layer is in the form of an adhering film.

8. An uncured composite product according to claim 1 wherein said hardening agent layer is in the form of a paste.

9. An uncured composite product according to claim 1 wherein said hardening agent layer is covered with a protective film or paper.

10. An uncured composite product according to claim 1 wherein said fibrous reinforcement layer comprises unidirectional filaments.

11. An uncured composite product according to claim 1 wherein said fibrous reinforcement layer comprises woven fabric.

12. An uncured composite product according to claim 1 wherein said fibrous reinforcement layer comprises nonwoven fabric.

13. An uncured composite product according to claim 1 wherein said thermosetting resin is selected from the group consisting of epoxy resins, vinyl ester resins, bismaleimide resins, phenolic resins and mixtures thereof.

14. An uncured composite product according to claim 1 wherein said fibrous reinforcement layer comprises fibers selected from the group consisting of glass fibers, carbon fibers and aramid fibers.

15. An uncured composite product according to claim 1 wherein said hardening agent is selected from the group consisting of cyanoguanidines, aliphatic and aromatic amines, acid anhydrides, Lewis acids, imidazoles, substituted ureas and hydrazines.

16. An uncured lay up that comprises a plurality of composite products according to claim 1 wherein said composite products are stacked together such that said resin layers and said hardening agent layers do not touch each other.

17. A cured composite material comprising an uncured product or uncured lay up according to claims 1 or 16 that has been cured to form said cured composite material.

18. A method for making an uncured composite product comprising the steps of:
provide a fibrous reinforcement layer including a first side, a second side and a fibrous body having openings therein between said first and second sides;
applying a resin layer to said first side of said fibrous reinforcement layer, said resin layer consisting essentially of a thermosetting resin; and
applying a hardening agent layer to said second side of said fibrous reinforcement layer, said hardening agent layer consisting essentially of a hardening agent for said thermosetting resin wherein said fibrous body provides a physical barrier that prevents contact between said thermosetting resin and said hardening agent.

19. A method for making an uncured lay up that comprises a plurality of composite products according to claim 1, said method comprising the step of stacking said composite products together such that said resin layers and said hardening agent layers do not touch each other.

20. A method for forming a cured composite material comprising the step of heating an uncured product or uncured lay up according to claims 1 or 16 to cure said uncured product or uncured lay up.

21. A method for forming a cured composite material according to claim 20 that includes the additional step of vibrating said uncured product or uncured lay up during said heating step.

* * * * *